United States Patent
Nicholas et al.

(10) Patent No.: US 11,513,575 B1
(45) Date of Patent: Nov. 29, 2022

(54) DYNAMIC USB-C MODE CONFIGURATION

(71) Applicant: DELL PRODUCTS, LP, Round Rock, TX (US)

(72) Inventors: Ken Nicholas, Leander, TX (US); Marcin M. Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/346,434

(22) Filed: Jun. 14, 2021

(51) Int. Cl.
*G06F 1/26* (2006.01)
*G06F 13/42* (2006.01)
*G06F 13/40* (2006.01)

(52) U.S. Cl.
CPC .......... *G06F 1/266* (2013.01); *G06F 13/4068* (2013.01); *G06F 13/4282* (2013.01); *G06F 2213/0042* (2013.01)

(58) Field of Classification Search
CPC .......... G06F 1/266; G06F 13/14; G06F 13/38; G06F 13/385; G06F 13/4004; G06F 13/4022; G06F 13/4063; G06F 13/4068; G06F 13/4282; G06F 2213/0042
See application file for complete search history.

(56) References Cited

U.S. PATENT DOCUMENTS

| | | | | |
|---|---|---|---|---|
| 10,331,579 B2 * | 6/2019 | Gupta | .................. | G06F 13/4068 |
| 10,676,358 B2 | 6/2020 | Hundal et al. | | |
| 10,949,374 B2 * | 3/2021 | Yin | ...................... | G06F 13/4077 |
| 2012/0203937 A1 * | 8/2012 | Mohanty | .................. | G06F 13/12 710/33 |
| 2016/0062924 A1 * | 3/2016 | Lee | ...................... | G06F 13/4068 710/14 |
| 2016/0110305 A1 * | 4/2016 | Hundal | ............... | G06F 13/4022 710/316 |
| 2016/0127671 A1 * | 5/2016 | Hundal | .................. | C01B 32/05 348/723 |
| 2016/0156137 A1 * | 6/2016 | Pan | ........................ | G06F 13/385 439/78 |
| 2016/0378704 A1 * | 12/2016 | Adamson | ............... | G06F 13/364 710/104 |
| 2016/0378971 A1 * | 12/2016 | Dunstan | .................. | G06F 21/44 726/17 |
| 2017/0161226 A1 * | 6/2017 | Gerber | .................. | G06F 13/385 |

(Continued)

OTHER PUBLICATIONS

Sarkar, Samit. "Why frame rate and resolution matter: A graphics primer". Polygon. Online Jun. 5, 2014. Retrieved from Internet May 26, 2022. <https://www.polygon.com/2014/6/5/5761780/frame-rate-resolution-graphics-primer-ps4-xbox-one>. (Year: 2014).*

*Primary Examiner* — Thomas J. Cleary
(74) *Attorney, Agent, or Firm* — Larson Newman, LLP

(57) ABSTRACT

An information handling system includes a USB-C port and a USB-C power delivery controller. The USB-C power delivery controller includes connection preference information, and is configured to detect that a device has been plugged into the USB-C port, determine that the device supports a first connection type and a second connection type, determine that the first connection type has a higher connection priority than the second connection type, and establish a connection between the information handling system and the device utilizing the second connection type based upon the connection preference information.

20 Claims, 3 Drawing Sheets

(56) References Cited

U.S. PATENT DOCUMENTS

| | | | |
|---|---|---|---|
| 2017/0192924 A1* | 7/2017 | Chiba | G06F 13/4282 |
| 2018/0004694 A1* | 1/2018 | Nemoto | G06F 13/385 |
| 2019/0042503 A1* | 2/2019 | Montero | G06F 13/4282 |
| 2019/0102335 A1* | 4/2019 | Tan | G06F 13/4221 |
| 2019/0121771 A1* | 4/2019 | Kadgi | G06F 1/1683 |
| 2020/0019526 A1* | 1/2020 | Wentroble | G06F 13/409 |
| 2020/0233822 A1* | 7/2020 | Zheng | G06F 3/1407 |
| 2020/0310512 A1* | 10/2020 | Mills | G06F 1/3287 |
| 2020/0410630 A1* | 12/2020 | Gopalakrishnan | G06F 13/382 |
| 2021/0200705 A1* | 7/2021 | Jiang | H04R 3/00 |

\* cited by examiner

DYNAMIC USB-C MODE CONFIGURATION

FIELD OF THE DISCLOSURE

This disclosure generally relates information handling systems, and more particularly relates to providing dynamic USB-C mode configurations in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a USB-C port and a USB-C power delivery controller. The USB-C power delivery controller may include connection preference information, and may be configured to detect that a device has been plugged into the USB-C port, to determine that the device supports a first connection type and a second connection type, to determine that the first connection type has a higher connection priority than the second connection type, and to establish a connection between the information handling system and the device utilizing the second connection type based upon the connection preference information

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
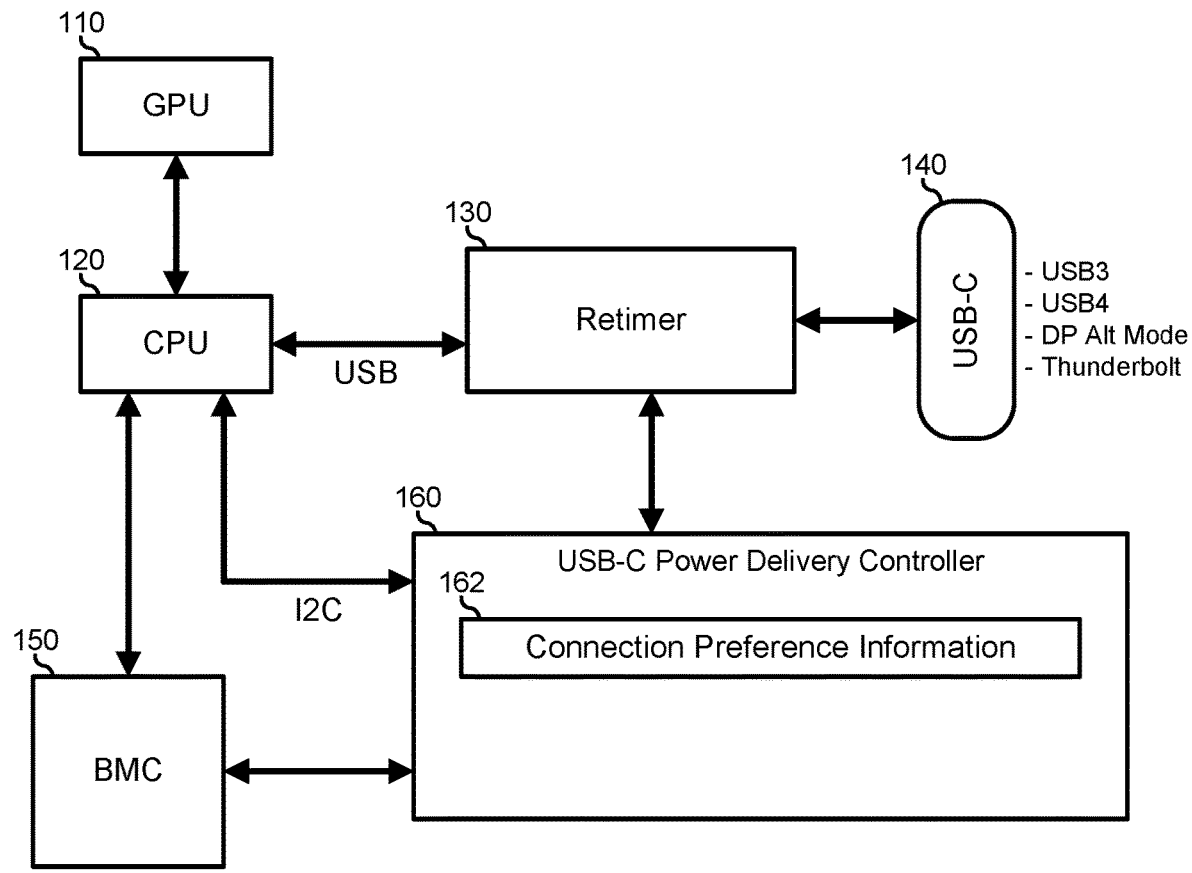
FIG. 1 is a block diagram of an information handling system according to an embodiment of the current disclosure.

FIG. 1 illustrates an information handling system 100 including a graphic processor unit (GPU) 110, a central processor unit (CPU) 120, a USB bus retimer 130, a USB-C port 140, a baseboard management controller 150, and a USB-C Power Delivery (PD) controller 160. Information handling system 100 represents various types of information handling systems, including personal computers, workstations, laptop computers, tablet devices, smartphone devices, data processing systems, or the like. GPU 110, CPU 120, retimer 130, and USB-C port 140 represent portions of a host processing system of information handling system 100 that provides the functions and features of an information handling system, such as are associated with a system BIOS/UEFI, an operating system (OS), applications and programs, and the like. As such, it will be understood that information handling system 100 may include additional elements, such as memory and data storage devices, I/O devices and controllers, and the like. BMC 150 and USB-C power delivery controller 160 represent portions of a management system of information handling system 100 that provides management and control of the hardware, firmware, and software of the information handling system, and may include additional elements as needed or desired.

The inclusion of USB-C port 140 provides information handling system 100 with great flexibility. For example, USB-C 140 port is functionally compatible with legacy USB and USB2 devices, USB3 devices (10 Gbit/s and 20 Gbits), USB4 devices (20 Gbit/s and 40 Gbit/s), tunneled DisplayPort and PCIe devices, operates in Thunderbolt Alternate mode and DisplayPort Alternate mode, and provides for power transfers between to and from the connected device, depending upon the nature of the device connected to the USB-C port. In particular, when a device is plugged in to USB-C port 140, USB-C PD controller 160 operates to negotiate the connection features with the connected device, and sets up information handling system 100 to operate compatibly with the connected device.

Further, information handling system 100 is configured to support alternate modes for driving USB-C port 140. In particular, retimer 130 includes a multiplexor 132 that permits USB-C port 140 to be driven by one of GPU 110 and CPU 120. Here, USB-C PD controller 160 operates to drive multiplexor 132 to select one of the inputs from GPU 110 and CPU 120 based upon the selected connection mode of USB-C port 140. GPU 110 may be understood to provide two-lane or four-lane DisplayPort output (DP ×2 or DP ×4), and CPU 120 may be understood to provide a USB4/

Thunderbolt output. In this way, information handling system 100 operates to optimize the utilization of USB-C port 140.

For example where greater video processing performance is needed or desired, such as in a gaming or CAD application, providing the DP ×2 output from GPU 110 may be more desirable than the USB4/Thunderbolt output from CPU 120. Where greater data throughput is needed or desired, such as in a streaming application, providing the USB4/Thunderbolt output may be more desirable than the DP ×2 output. Here USB-C PD controller 160 selects the appropriate output connection to provide to USB-C port 140, based upon the current workload instantiated on information handling system 100. In a particular embodiment, CPU 120 determines the output to be selected by USB-C PD controller 160, and communicates the determination via an I2C interface, or BMC 150 determines the output to be selected by the USB-C PD controller, as needed or desired.

Typically, a USB-C PD controller similar to USB-C PD controller 160 operates to implement a fixed prioritization of the connection states of a USB-C port. For example, a USB-C PD controller may prioritize establishing a Thunderbolt connection state whenever the connected device supports a Thunderbolt connection, may prioritize establishing a DisplayPort Alt Mode connections state when the connected device does not support a Thunderbolt connection but does support a DisplayPort Alt Mode connection, and so on. It has been understood by the inventors of the current disclosure that, with the increasing bandwidth limits of the various USB-C connections, there may be some lower priority connection states that actually provide enhanced performance over the higher priority connection states.

For example, the DisplayPort 2.0 standard is expected to require Ultra-High Bit Rate 20 (UHBR20) functionality at 20 Gbit/s. It may be desirable to establish a DP 2.0 Alt Mode connections, which supports DP ×2 (40 Gbit/s graphics bandwidth) along with USB (10 Gbit/s bi-directional data bandwidth), rather than defaulting to a USB4/Thunderbolt connection (40 Gbit/s bi-directional data bandwidth), particularly where better graphics performance is desired. However, if USB-C PD controller 160 utilized a fixed prioritization of connection modes, the USB-C PD controller would not be expected to select a DP 2.0 Alt Mode connection over a USB4 connection.

In a particular embodiment, USB-C PD controller 160 includes connection preference information 162 that the USB-C PD controller utilizes to determine the connection state to select, and to determine if a different connection mode is preferred over the fixed default priority connection mode. Connection preference information 162 includes user display preference information, such as whether the user prefers graphics to be sourced from GPU 110 or CPU 120, user mode preference, such as whether the user prefers to prioritize graphics or data, system graphics bandwidth capability information (such as HBR3/UHBR10/UHBR20), dock/device capability information, such as whether or not a dock is identified as supporting ×2 DisplayPort 2.0 capability, current workload information, such as whether information handling system 100 is running a gaming or CAD application, a streaming application, a virtual desktop application, or the like, and other information as needed or desired. For example, where information handling system 100 supports Display Port 2.0 UHBR20, connection preference information 162 may include the following:

User display preference—discrete (i.e., GPU 110)
User mode preference—graphics priority
System graphics bandwidth—discrete GPU supports UHBR20
Dock/device capability—DisplayPort 2.0 UHBR20 support
Current workload includes gaming or CAD Here, when USB-C port 140 is connected to a dock that supports both USB4/Thunderbolt 4 and DisplayPort 2.0 Alt-Mode, USB-C PD controller 160 will select the DisplayPort 2.0 Alt-Mode, providing highest display bandwidth. However, if the current workload includes a virtual desktop application, USB-C PD controller 160 will select the USB4/Thunderbolt4 Mode, providing highest bi-directional data bandwidth.

Figure 2:
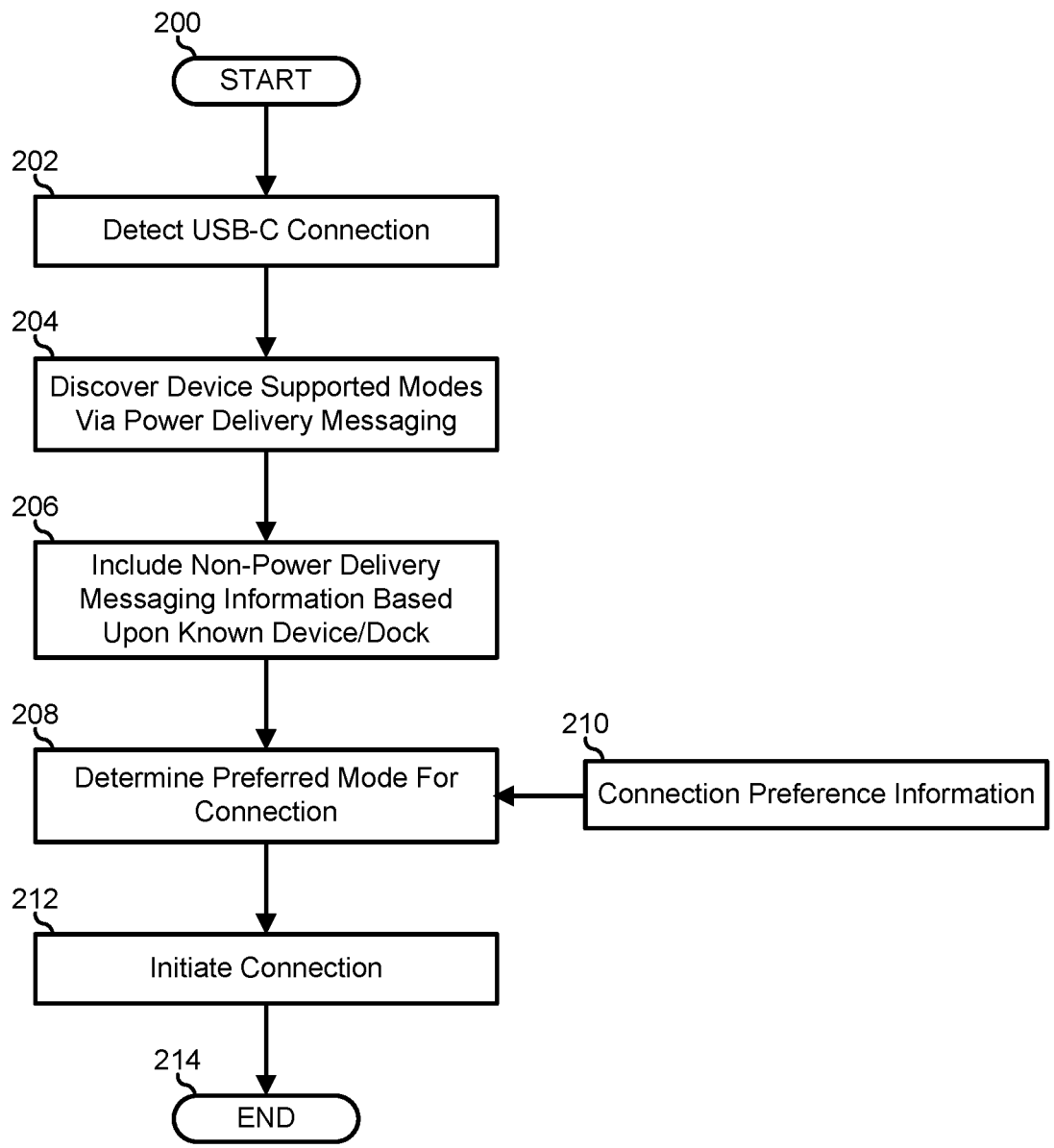
FIG. 2 is a flow chart illustrating a method for providing dynamic USB-C mode configurations in an information handling system according to an embodiment of the current disclosure.

FIG. 2 illustrates a method for providing dynamic USB-C mode configurations in an information handling system, starting at block 200. The connection of a device to a USB-C port of the information handling system is detected in block 202. A USB-C PD controller discovers the supported connection modes for the connected device utilizing USB-C Power Delivery messaging in block 204. The USB-C controller or another element of the information handling system determines additional information from the device utilizing messaging other than USB-C Power Delivery messaging in block 206. Here, various vendor defined messaging (VDM) may be utilized by the information handling system to determine the functions and features of the connected device. The USB-C PD controller references connection preference information 210 and determines a preferred connection mode for the device in block 208. The USB-C PD controller initiates the connection with the preferred connection mode in block 212, and the method ends in block 214.

Figure 3:
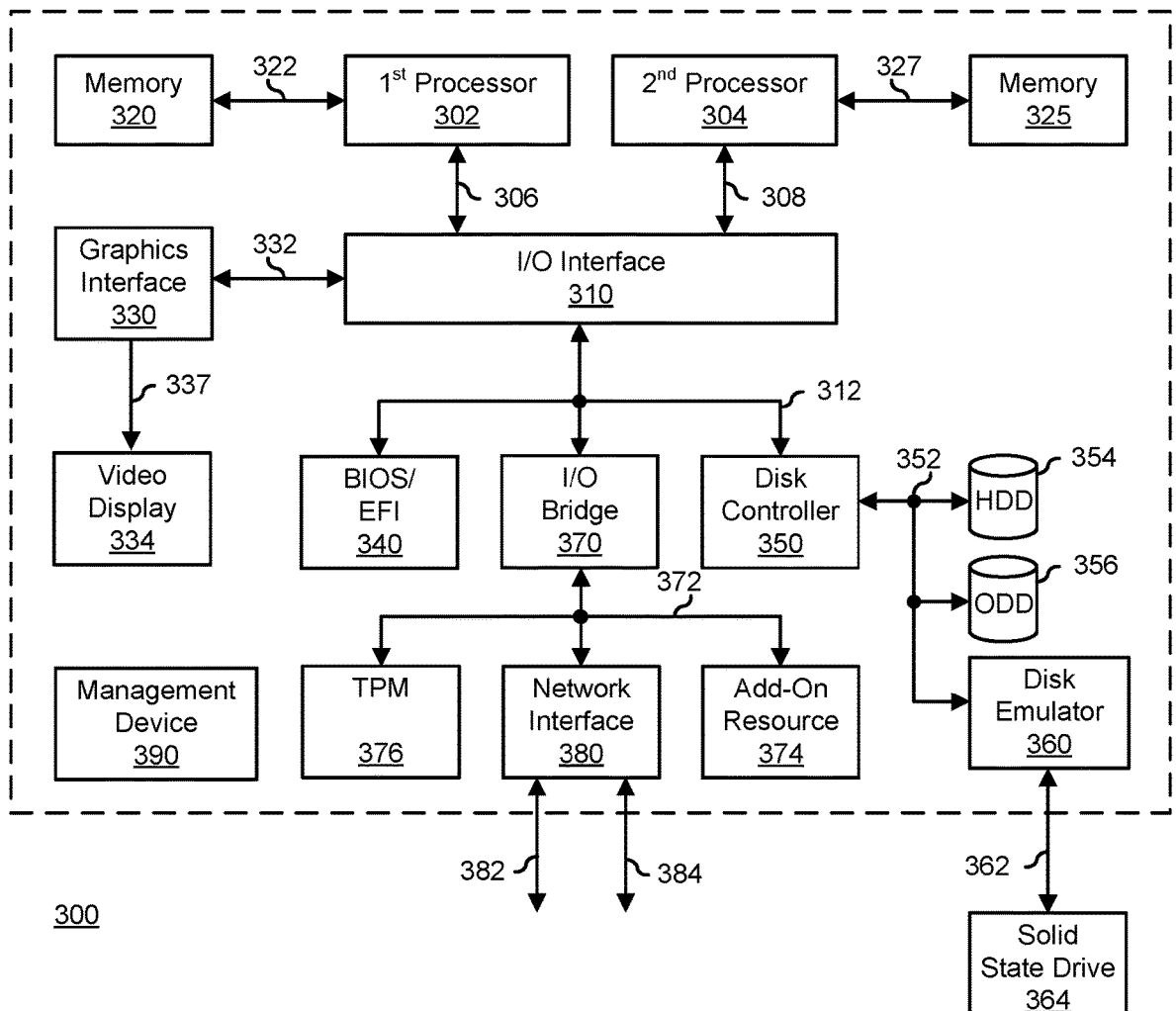
FIG. 3 is a block diagram illustrating a generalized information handling system according to another embodiment of the current disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O)

interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a USB-C port; and
   a USB-C power delivery controller including connection preference information, the USB-C power delivery controller configured to:
   detect that a device has been plugged into the USB-C port;
   determine that the device supports a first connection type and a second connection type;
   determine that the first connection type has a higher connection priority than the second connection type;
   determine that a first workload running on the information handling system is a first workload type that operates optimally with the second connection type; and
   establish a connection between the information handling system and the device utilizing the second connection type based upon the first workload being of the first workload type.

2. The information handling system of claim 1, wherein the connection preference information includes a user graphics source preference.

3. The information handling system of claim 2, further comprising:
   a data processor including an integrated USB controller; and
   a graphics processor, wherein the user graphics source preference includes a user preference for one of the data processor and the graphics processor.

4. The information handling system of claim 1, wherein the connection preference information includes a user USB connection mode preference.

5. The information handling system of claim 4, wherein the user USB connection mode preference is selected from one of a USB4 connection mode, a Thunderbolt connection mode, and a DisplayPort connection mode.

6. The information handling system of claim 1, wherein the connection preference information includes a system graphics bandwidth preference.

7. The information handling system of claim 6, wherein the system graphics bandwidth preference is selected from one of a High Bit Rate-3 (HBR3) bandwidth, an Ultra-High Bit Rate-10 (UHBR10) bandwidth, and an Ultra-High Bit Rate-20 (UHBR-20) bandwidth.

8. The information handling system of claim 1, wherein subsequent to determining that the first workload is the first workload type, the USB-C power delivery controller is further configured to:
   determine that a second workload running on the information handling system is a second workload type that operates optimally with the first connection type; and
   reestablish the connection between the information handling system and the device utilizing the first connection type based upon the second workload being of the second workload type.

9. The information handling system of claim 1, wherein the first connection type include one of a USB4 connection, a Thunderbolt connection, a DisplayPort connection, and a tunneled PCIe connection.

10. A method, comprising:
    detecting, by a USB-C power delivery controller of an information handling system, that a device has been plugged into a USB-C port of the information handling system;
    determining that the device supports a first connection type and a second connection type;
    determining that the first connection type has a higher connection priority than the second connection type;
    determining that a first workload running on the information handling system is a first workload type that operates optimally with the second connection type; and
    establishing a connection between the information handling system and the device utilizing the second connection type based upon the first workload being of the first workload type.

11. The method of claim 10, wherein the connection preference information includes a user graphics source preference.

12. The method of claim 11, wherein the user graphics source preference includes a user preference for one of a data processor of the information handling system and a graphics processor of the information handling system.

13. The method of claim 10, wherein the connection preference information includes a user USB connection mode preference.

14. The method of claim 13, wherein the user USB connection mode preference is selected from one of a USB4 connection mode, a Thunderbolt connection mode, and a DisplayPort connection mode.

15. The method of claim 10, wherein the connection preference information includes a system graphics bandwidth preference.

16. The method of claim 15, wherein the system graphics bandwidth preference is selected from one of a High Bit Rate-3 (HBR3) bandwidth, an Ultra-High Bit Rate-10 (UHBR10) bandwidth, and an Ultra-High Bit Rate-20 (UHBR-20) bandwidth.

17. The method of claim 10, wherein subsequent to determining that the first workload is the first workload type, the method further comprises:

determining that a second workload running on the information handling system is a second workload type that operates optimally with the first connection type; and reestablishing the connection between the information handling system and the device utilizing the first connection type based upon the second workload being of the second workload type.

18. The method of claim 10, wherein the first connection type include one of a USB4 connection, a Thunderbolt connection, a DisplayPort connection, and a tunneled PCIe connection.

19. An information handling system, comprising:

a USB-C port;

a device coupled to the USB-C port; and a USB-C power delivery controller including connection preference information, the USB-C power delivery controller configured to:

detect that the device has been plugged into the USB-C port;

determine that the device supports a first connection type and a second connection type;

determine that the first connection type has a higher connection priority than the second connection type;

determine that a workload running on the information handling system is a particular workload type that operates optimally with the second connection type; and establish a connection between the information handling system and the device utilizing the second connection type based upon the workload being of the particular workload type, wherein the connection preference information includes information that describes a function of the device.

20. The information handling system of claim 19, wherein the first and second connection types include one of a USB4 connection, a Thunderbolt connection, a DisplayPort connection, and a tunneled PCIe connection.

* * * * *